(12) United States Patent
Kajita et al.

(10) Patent No.: US 11,518,093 B2
(45) Date of Patent: Dec. 6, 2022

(54) ADDITIVE MANUFACTURING SYSTEM AND REMOVING METHOD

(71) Applicant: SINTOKOGIO, LTD., Nagoya (JP)

(72) Inventors: Kouji Kajita, Toyokawa (JP); Kazuya Kojima, Toyokawa (JP); Takaya Nakane, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 155 days.

(21) Appl. No.: 16/825,440

(22) Filed: Mar. 20, 2020

(65) Prior Publication Data
US 2020/0307078 A1 Oct. 1, 2020

(30) Foreign Application Priority Data
Mar. 29, 2019 (JP) .............................. JP2019-067304

(51) Int. Cl.
| | |
|---|---|
| *B29C 64/188* | (2017.01) |
| *B29C 64/35* | (2017.01) |
| *B29C 64/241* | (2017.01) |
| *B29C 64/379* | (2017.01) |
| *B33Y 40/20* | (2020.01) |
| *B33Y 10/00* | (2015.01) |
| *B33Y 30/00* | (2015.01) |

(52) U.S. Cl.
CPC .......... *B29C 64/188* (2017.08); *B29C 64/241* (2017.08); *B29C 64/35* (2017.08); *B29C 64/379* (2017.08); *B33Y 10/00* (2014.12); *B33Y 30/00* (2014.12); *B33Y 40/20* (2020.01)

(58) Field of Classification Search
None
See application file for complete search history.

(56) References Cited

U.S. PATENT DOCUMENTS

| | | | | |
|---|---|---|---|---|
| 6,916,441 | B2 * | 7/2005 | Newell | .................. B33Y 40/00 |
| | | | | 264/442 |
| 2009/0283119 | A1 * | 11/2009 | Moussa | .................. B29C 71/04 |
| | | | | 134/57 R |
| 2016/0059270 | A1 * | 3/2016 | Chen | ......................... B08B 3/02 |
| | | | | 134/111 |
| 2018/0133968 | A1 | 5/2018 | Zeulner | |
| 2018/0194065 | A1 | 7/2018 | Koch et al. | |
| 2018/0215106 | A1 | 8/2018 | McMahon et al. | |
| 2019/0176403 | A1 * | 6/2019 | Hutchinson | ............ B33Y 40/00 |

(Continued)

FOREIGN PATENT DOCUMENTS

| | | |
|---|---|---|
| CN | 109047171 A | 12/2018 |
| JP | 2011-520655 A | 7/2011 |

(Continued)

*Primary Examiner* — Matthew J Daniels
*Assistant Examiner* — Paul Spiel
(74) *Attorney, Agent, or Firm* — Faegre Drinker Biddle & Reath LLP (57) ABSTRACT

An additive manufacturing system comprises an additive manufacturing apparatus forming a molded object by curing slurry which becomes a base material of the molded object and a removing apparatus removing slurry attached to the molded object, in which the removing apparatus comprises a container having an axis of rotation and a peripheral wall provided with a plurality of small holes, the container permitting the molded object to be fixed therein, and a drive unit driving the container to rotate around the axis of rotation.

4 Claims, 7 Drawing Sheets

(56) References Cited

U.S. PATENT DOCUMENTS

2019/0224917 A1* 7/2019 Venkatakrishnan ........................
                                                                                                         B29C 64/205
2021/0086450 A1* 3/2021 Murillo .................. B33Y 40/00
2021/0308947 A1* 10/2021 Diez ...................... B33Y 40/20

FOREIGN PATENT DOCUMENTS

| JP | 2014-104683 A | 6/2014 |
| JP | 2016-203425 A | 12/2016 |
| WO | WO-2009/140449 A2 | 11/2009 |
| WO | WO-2018/118032 A1 | 6/2018 |
| WO | WO-2019/023120 A1 | 1/2019 |
| WO | WO-2019/209732 A1 | 10/2019 |

* cited by examiner

ADDITIVE MANUFACTURING SYSTEM AND REMOVING METHOD

CROSS-REFERENCE TO RELATED APPLICATION

This application is based on Japanese Patent Application No. 2019-067304 filed with Japan Patent Office on Mar. 29, 2019, the entire contents of which are hereby incorporated by reference.

TECHNICAL FIELD

The present disclosure relates to an additive manufacturing system and a removing method.

BACKGROUND

Japanese Unexamined Patent Publication No. 2016-203425 describes a manufacturing method for manufacturing a three-dimensional molded object by lamination. In this method, a layer is formed on a stage by a layer forming unit and the layer is cured by binding liquid application means and ultraviolet light irradiation means. A molded object embedded in a laminated body is thereby obtained.

SUMMARY

By the way, slurry that is a fluid in which particles are suspended may be used as a base material for the molded object. When the molded object is formed using slurry as the base material, the molded object is obtained as being embedded in uncured slurry. When the molded object embedded in the uncured slurry is extracted, the uncured slurry may be attached to the molded object. The uncured slurry attached to the molded object needs to be cleaned and removed. For example, an operator may manually clean and remove the uncured slurry. However, the manual operation by the operator might be unable to efficiently remove the uncured slurry attached to the molded object having a complicated shape. When there are many types of molded objects or many molded objects, more operation time may be required.

The present disclosure provides an additive manufacturing system and a removing method capable of efficiently removing slurry attached to a molded object.

An additive manufacturing system according to an aspect of the present disclosure comprises an additive manufacturing apparatus forming a molded object by curing slurry that is a base material of the molded object and a removing apparatus removing the slurry attached to the molded object, in which the removing apparatus comprises a container having an axis of rotation and a peripheral wall provided with a plurality of small holes, the container permitting the molded object to be fixed therein, and a drive unit driving the container to rotate around the axis of rotation.

In this additive manufacturing system, the additive manufacturing apparatus forms a molded object by curing slurry. The molded object is fixed in the container. The container includes the axis of rotation and is driven to rotate around the axis of rotation by the drive unit. Since the slurry attached to the molded object has a weaker binding force than that of the slurry cured as the molded object, the slurry is separated from the molded object by a centrifugal force generated in the container. The separated slurry is transferred to the outside via a plurality of small holes provided in the peripheral wall of the container. This allows the additive manufacturing system to easily obtain the molded object with reduced attachment of slurry in the container. Therefore, according to the present additive manufacturing system, it is possible to efficiently remove the slurry attached to the molded object.

In the embodiment, the removing apparatus may comprise a storage unit including an exhaust port providing communication between an inside and an outside, housing the container therein and storing slurry to be transferred to the outside of the container via the small holes, and a vibration unit vibrating the storage unit and discharging the slurry in the storage unit from the exhaust port. In this case, since the container is housed in the storage unit, the slurry separated from the molded object is stored in the storage unit via a plurality of small holes provided in the peripheral wall of the container. When the vibration unit vibrates the storage unit, fluidity of the slurry stored in the storage unit increases, which facilitates the movement of the slurry to the exhaust port. Therefore, the present additive manufacturing system allows the slurry in the storage unit separated from the molded object to be easily discharged from the exhaust port.

In the embodiment, the removing apparatus may comprise a nozzle supplying a liquid or gas toward an inner surface of the container. Even when the molded object has a complicated shape, the supplied liquid or gas can more easily penetrate into small parts of the molded object by a centrifugal force as the container rotates. This reduces man-hours in a cleaning step of the molded object. Since the slurry attached to the molded object has higher fluidity than the molded object, the slurry is mixed with the supplied liquid or gas and is easily separated from the molded object. In this way, the additive manufacturing system can efficiently remove the slurry attached to the molded object.

A removing method according to another aspect of the present disclosure is a removing method for removing slurry attached to a molded object formed by the additive manufacturing apparatus, comprising a step of fixing a molded object inside a container having an axis of rotation and a peripheral wall provided with a plurality of small holes, and a step of rotating the container with the molded object fixed therein around the axis of rotation.

According to the present removing method, in the step of fixing, the molded object is fixed in the container having the axis of rotation. In the step of rotating, the container rotates around the axis of rotation. Since the slurry attached to the molded object has a weaker binding force than the slurry cured as the molded object, it is separated from the molded object by a centrifugal force generated in the container. The separated slurry is transferred to the outside via a plurality of small holes provided in the peripheral wall of the container. Thus, the present removing method can easily obtain the molded object with reduced attachment of slurry in the container. Therefore, the present removing method can efficiently remove the slurry attached to the molded object.

In the embodiment, the method may further comprise a step of storing slurry to be transferred to an outside of the container via small holes of the container in a storage unit comprising an exhaust port providing communication between an outside and an inside and housing the container therein, and a step of vibrating the storage unit and discharging the slurry in the storage unit from the exhaust port. In the step of storing, the container is housed in the storage unit and the slurry separated from the molded object is thereby stored in the storage unit via a plurality of small holes provided in the peripheral wall of the container. In the step of discharging, fluidity of the slurry stored in the storage unit increases by vibrating the storage unit, and so the slurry is more easily moved to the exhaust port. The present removing method can thereby easily discharge the slurry in the storage unit separated from the molded object from the exhaust port.

In the embodiment, the method may further comprise a step of supplying a liquid or gas to an inner surface of the container. Even when the molded object has a complicated shape, the supplied liquid or gas can easily penetrate into small parts of the molded object by a centrifugal force as the container rotates. Thus, man-hours in the cleaning step of the molded object are reduced. The slurry attached to the molded object has higher fluidity than the molded object, and so the slurry is mixed with the supplied liquid or gas and can be easily separated from the molded object. Thus, the present removing method can efficiently remove the slurry attached to the molded object.

In the embodiment, a step of pressing a concave mold of at least part of the molded object against the molded object may be included before the step of fixing. In the step of pressing, at least part of the slurry attached to the molded object is removed by pressing the concave mold. This reduces the amount of slurry removed in the removing method after the step of pressing, and so the present removing method can efficiently remove the slurry attached to the molded object.

According to the additive manufacturing system and the removing method of the present disclosure, it is possible to efficiently remove slurry attached to a molded object.

DETAILED DESCRIPTION

Hereinafter, an embodiment of the present invention will be described with reference to the accompanying drawings. Note that identical or corresponding elements in the following description are assigned the same reference numerals and duplicate description will not be repeated. Dimensional ratios among the drawings do not always coincide with the described ones. Terms "up," "down," "left" and "right" are based on the illustrated states, and are for convenience.

Figure 1:
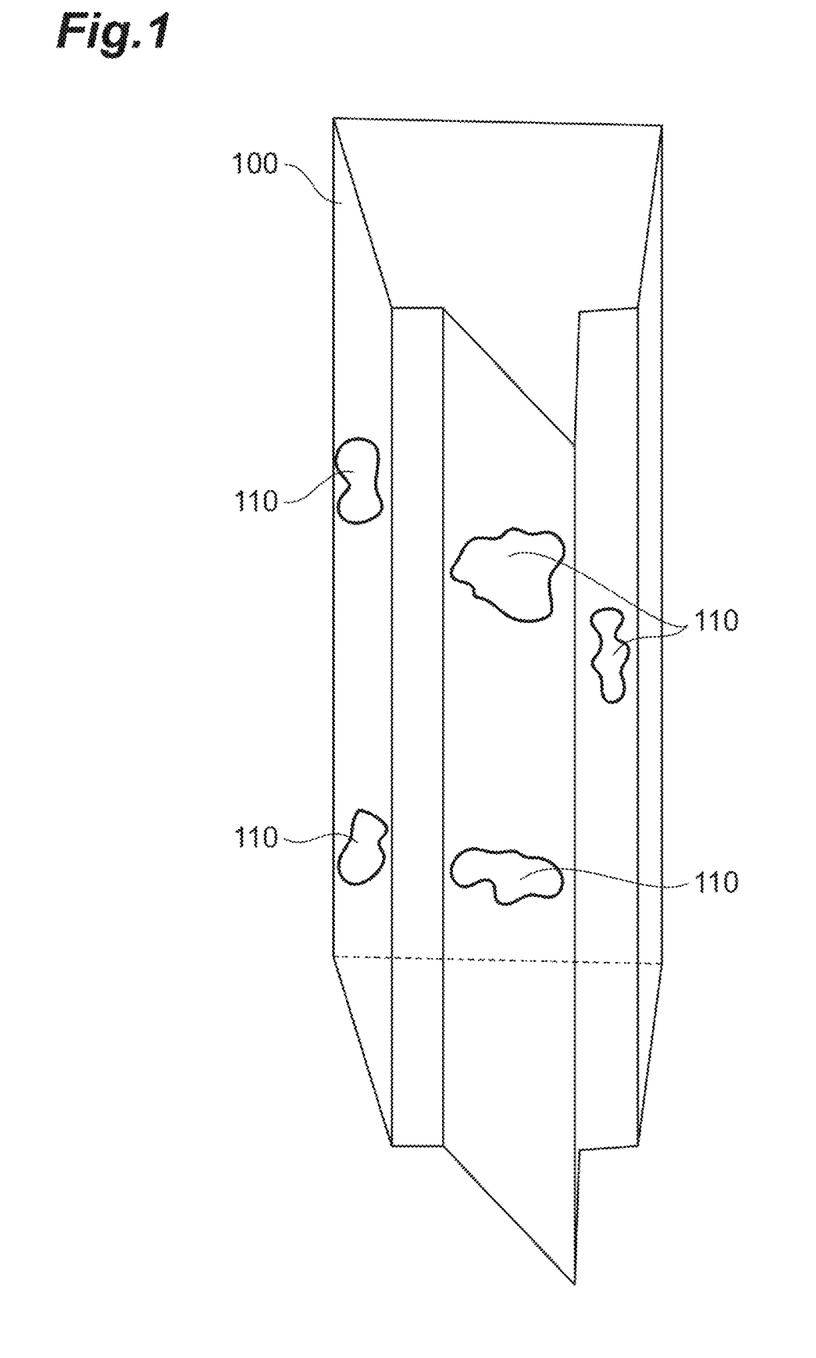
FIG. 1 is a perspective view of a molded object to which slurry is attached.

FIG. 1 is a perspective view of a molded object to which slurry is attached. A molded object 100 shown in FIG. 1 is formed by an additive manufacturing apparatus. The molded object 100 is a three-dimensional solid body formed by lamination. One layer of the molded object 100 is obtained by irradiating slurry with ultraviolet light and curing the slurry. The slurry is a base material of the molded object 100. The slurry is a material in which ultraviolet light curable resin and ceramic powder or metal powder are mixed and exhibits viscosity. When the molded object 100 is extracted from the additive manufacturing apparatus, uncured slurry 110 may be attached to a surface thereof. More specifically, the uncured slurry 110 located around the molded object 100 during the formation in the additive manufacturing apparatus may be attached to the surface of the molded object 100 and may still remain attached to the surface of the molded object 100 even after extracting the molded object 100 from the additive manufacturing apparatus.

Figure 2:
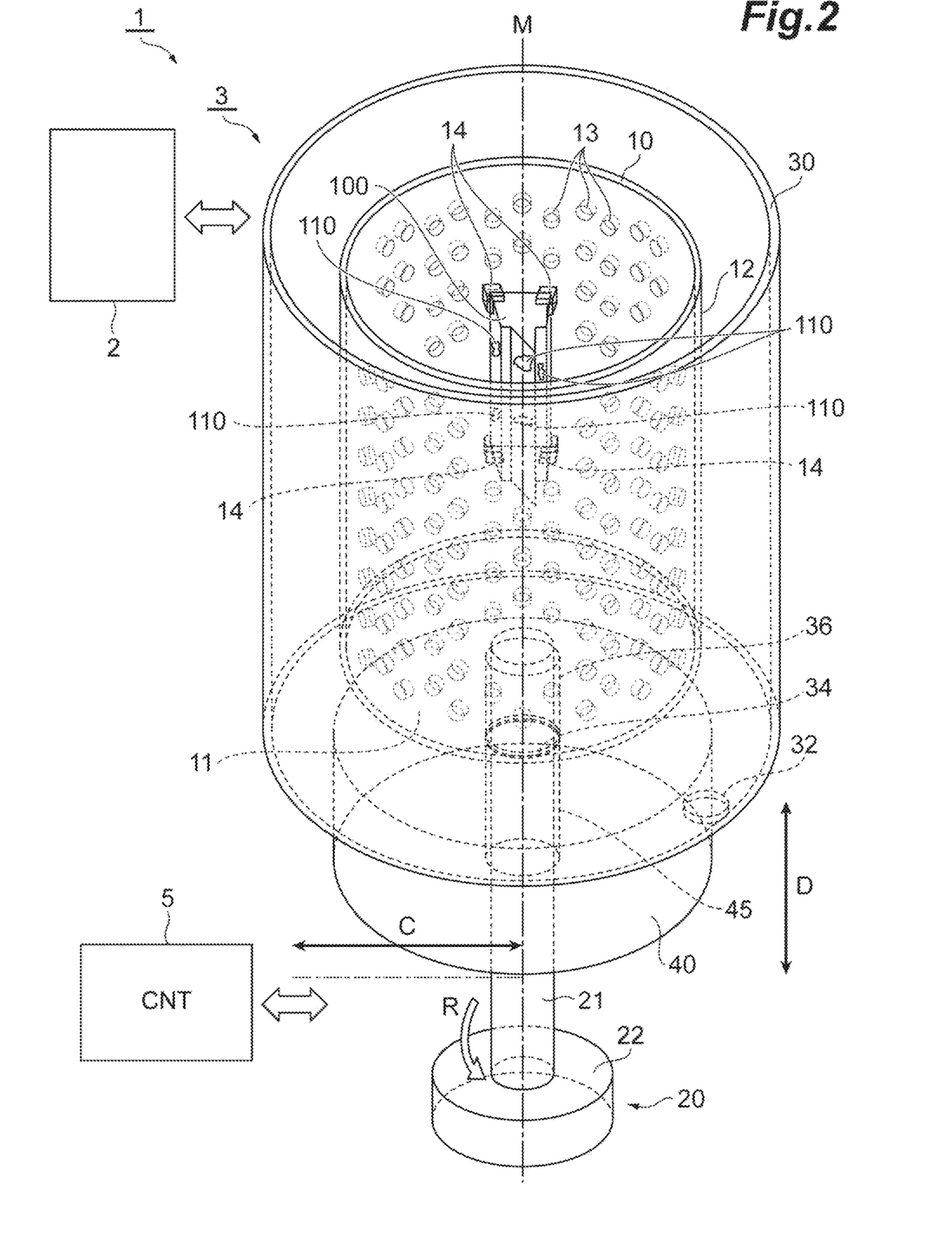
FIG. 2 is a schematic view illustrating an example of an additive manufacturing system according to an embodiment.

FIG. 2 is a schematic view illustrating an example of an additive manufacturing system according to the embodiment. An additive manufacturing system 1 shown in FIG. 2 is provided with an additive manufacturing apparatus 2 and a removing apparatus 3. The additive manufacturing apparatus 2 cures slurry and forms the molded object 100. The removing apparatus 3 removes the uncured slurry 110 attached to the molded object 100 formed by the additive manufacturing apparatus 2.

The additive manufacturing apparatus 2 forms the molded object 100 by placing slurry on a stage by one layer at a time while causing the stage to descend and irradiating the slurry with ultraviolet light. As an example, the additive manufacturing apparatus 2 forms the molded object 100 based on three-dimensional CAD data. The three-dimensional CAD data includes data of a cross-sectional shape for each layer. The additive manufacturing apparatus 2 forms a cross section of the molded object 100 by one layer at a time based on the data of the cross-sectional shape. The additive manufacturing apparatus 2 includes, for example, a stage on which the slurry is placed, a supply unit supplying the slurry, a flattening unit flattening the supplied slurry, an irradiation unit radiating ultraviolet light, a drive unit causing the stage, the supply unit, the flattening unit and the irradiation unit to move, and a control unit controlling these movements. According to such a configuration, the additive manufacturing apparatus 2 forms the molded object 100 using the slurry.

The removing apparatus 3 is an apparatus separating the uncured slurry 110 attached to the molded object 100 by a centrifugal force. As an example, the removing apparatus 3 is provided with a controller 5, a container 10, a drive unit 20, a storage unit 30 and a vibration unit 40.

The container 10 is opened at a top and defines a space in which the molded object 100 can be fixed. The container 10 is cylindrical, includes an axis of rotation M in a direction along a center line and includes a base section 11, a peripheral wall 12 and fixing members 14.

The base section 11 is located at a bottom end of the container 10, disk-shaped and is a region having a circular top surface 11a and an undersurface 11b. The base section 11 is provided at a bottom end of the peripheral wall 12 in such a posture that the top surface 11a and the undersurface 11b are horizontal. The center line of the container 10 is a straight line passing through the centers of the circles of the top surface 11a and the undersurface 11b of the base section 11 and perpendicular to the top surface 11a and the undersurface 11b. Hereinafter, a direction along the center line of the container 10 is assumed to be a center line direction D. The axis of rotation M is, for example, an axis extending in the center line direction D and connecting the centers of the circles of the top surface 11a and the undersurface 11b of the container 10. Note that the base section 11 may include a plurality of openings communicating the top surface 11a and the undersurface 11b in the center line direction D at positions other than the position at which the undersurface 11b and the drive unit 20 are connected.

The peripheral wall 12 is hollow and cylindrical, and is a region opened at the top and at the bottom. The center line of the peripheral wall 12 coincides with the axis of rotation M. The bottom end of the peripheral wall 12 is connected to the top surface 11a of the base section 11. The peripheral wall 12 is provided with a plurality of small holes 13. The plurality of small holes 13 communicate the inside and the outside of the container 10. The plurality of small holes 13 penetrate the peripheral wall 12, for example, in a radial direction C. The "radial direction C" is a direction in which the radius of the top surface 11a of the base section 11 extends. The size of each small hole 13 is set as appropriate, for example, to a size smaller than the size of the molded object 100, a size at which slurry is movable. The number of small holes 13 can be set arbitrarily.

The fixing members 14 fix the molded object 100 in the container 10. The fixing members 14 are hook-shaped. The fixing members 14 are provided inside the peripheral wall 12 to restrict the movement of the molded object 100. The fixing members 14 are members freely attachable/detachable to/from the peripheral wall 12 and the positions at which they are provided can be changed as appropriate. Two or more fixing members 14 may be provided. The fixing members 14 can be fixed inside the peripheral wall 12 according to the size and shape of the molded object 100 by changing the positions and the number as appropriate.

The drive unit 20 drives the container 10 to rotate around the axis of rotation M. The drive unit 20 is connected, for example, to the undersurface 11b of the container 10. The drive unit 20 includes a rod 21 and a drive source 22 causing the rod 21 to rotate. The rod 21 is provided, for example, in such a way as to pass through the axis of rotation M along the center line direction D. A top end of the rod 21 is connected to the undersurface 11b of the container 10 to support the container 10. A bottom end of the rod 21 is connected to the drive source 22. The drive source 22 is, for example, a motor. The drive source 22 drives the rod 21 to rotate to thereby cause the container 10 connected to the rod 21 to rotate. The rotating direction R which is a direction in which the container 10 is driven to rotate by the drive unit 20 is set as appropriate.

The storage unit 30 stores therein the uncured slurry 110 transferred to the outside of the container 10 via the plurality of small holes 13 of the container 10. The storage unit 30 has, for example, a bottomed cylindrical shape and includes the axis of rotation M in the center line direction D. The storage unit 30 houses the container 10 therein. A top end of the storage unit 30 is located at least at the same position as the top end of the container 10 or above the top end of the container 10. The inner circumferential surface of the storage unit 30 is provided separate from the peripheral wall 12 of the container 10. The storage unit 30 includes an exhaust port 32, an opening 34 and a rod housing cylinder 36.

The exhaust port 32 communicates the outside and the inside of the storage unit 30 and is provided in the bottom surface of the storage unit 30. The size of the exhaust port 32 is set to an appropriate size to allow outflow of slurry. The bottom surface of the storage unit 30 may be sloped toward the exhaust port 32 so that the exhaust port 32 becomes a lowest position. Two or more exhaust ports 32 may be provided.

The rod 21 of the drive unit 20 is inserted into the storage unit 30 from below the bottom surface of the storage unit 30 via the inside of the opening 34 and the rod housing cylinder 36 and connected to the undersurface 11b of the container 10. The opening 34 is provided in the bottom surface of the storage unit 30 centered on the axis of rotation M and is, for example, a circular opening. The size of the opening 34 is larger than the size of the cross section of the rod 21.

The rod housing cylinder 36 houses part of the rod 21. The rod housing cylinder 36 is joined to the bottom surface of the storage unit 30 in such a way that slurry does not flow out from the opening 34. The rod housing cylinder 36 is, for example, a cylindrical member, upper and lower parts of which are opened. A cross section of the rod housing cylinder 36 is larger than a cross section of the rod 21. The bottom end of the rod housing cylinder 36 is provided at the opening 34 and extends upward. The bottom end of the rod housing cylinder 36 is fitted into the opening 34 and fixed, for example, in such a way as to close the outer perimeter of the opening 34. The top end of the rod housing cylinder 36 is located below the top end of the rod 21 and provided separate from the bottom surface of the storage unit 30. The length in the center line direction D of the rod housing cylinder 36 is set as appropriate in accordance with the amount of slurry stored below the storage unit 30. The rod housing cylinder 36 may be provided with a top surface within a range that does not interfere with the rotation of the rod 21.

The vibration unit 40 vibrates the storage unit 30. The vibration unit 40 is, for example, a vibrator. The top surface of the vibration unit 40 is connected, for example, to the bottom surface of the storage unit 30. The vibration unit 40 includes, for example, a communication port 45 communicating the top surface and the bottom surface of the vibration unit 40 so that the vibration unit 40 does not interfere with the rod 21 of the drive unit 20. The rod 21 reaches the bottom surface of the storage unit 30 from below the bottom surface of the vibration unit 40 via the communication port 45. Note that when the vibration unit 40 is disposed at a position that does not interfere with the rod 21 or the vibration unit 40 has a size that does not interfere with the rod 21, the vibration unit 40 need not include the communication port 45.

Figure 3:
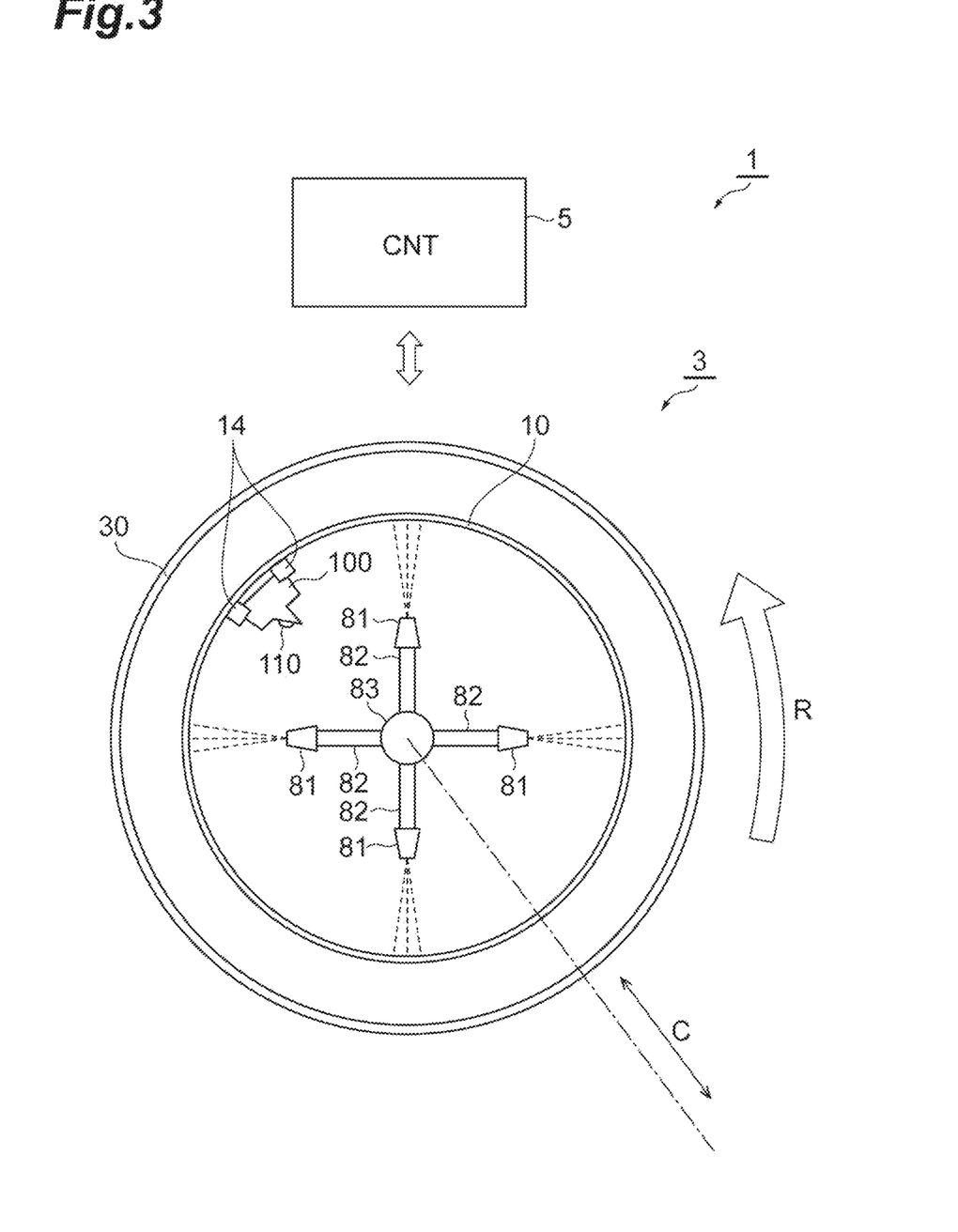
FIG. 3 is a plan view illustrating an example of the additive manufacturing system according to the embodiment.

The removing apparatus 3 may be provided with a nozzle 81. FIG. 3 is a plan view illustrating an example of the additive manufacturing system according to the embodiment. In FIG. 3, descriptions of the drive unit 20 and the vibration unit 40 are omitted.

The nozzle 81 supplies a liquid or gas to the inner surface of the container 10. An example of the liquid or gas supplied from the nozzle 81 is a cleaning liquid. Specific examples of the cleaning liquid include an organic solvent such as ethanol, methanol, acetone, isobutyl alcohol, toluene or xylene, or an acrylic monomer or epoxy monomer containing a polymerization inhibitor. The nozzle 81 supplies the cleaning liquid to the molded object 100 or the uncured slurry 110 attached to the molded object 100 for cleaning.

The nozzle 81 is connected, for example, to a cleaning pipe 82 and a cleaning pump 83. The cleaning liquid is supplied to the nozzle 81 by the cleaning pump 83 via the cleaning pipe 82. The nozzle 81 is disposed, for example, in the container 10 and extends along the axis of rotation M. Since the inside of the peripheral wall 12 of the container 10 passes through a position corresponding to the nozzle 81 as the container 10 rotates, the nozzle 81 can supply the cleaning liquid at an arbitrary position inside the peripheral wall 12 of the container 10. The amount of the cleaning liquid supplied from the nozzle 81 is determined based on the length in the center line direction D of the container 10, the rotating speed of the container 10 or the shape of the molded object or the like. Two or more nozzles 81, cleaning pipes 82 or cleaning pumps 83 may be provided. Note that the nozzle 81 may be provided in such a way as to be movable back and forth with respect to the inside of the container 10.

The controller 5 shown in FIG. 2 and FIG. 3 is hardware controlling the removing apparatus 3. The controller 5 is constructed of a general-purpose computer including, for example, an operation apparatus such as a CPU (Central Processing Unit), a storage apparatus such as ROM (Read Only Memory), RAM (Random Access Memory), HDD (Hard Disk Drive) and a communication apparatus. The controller 5 is communicably connected to the drive unit 20. The respective components of the removing apparatus 3 operate based on control by the controller 5. For example, the controller 5 causes the drive unit 20 to drive the container 10 to rotate and separate the uncured slurry 110 on the molded object 100 fixed in the container 10 by a centrifugal force. The removing apparatus 3 stores the separated uncured slurry 110 in the storage unit 30. The removing apparatus 3 collects the uncured slurry 110, the fluidity of which has been increased by the vibration unit 40. The controller 5 causes the nozzle 81 to supply the cleaning liquid toward the inner circumferential surface of the container 10.

Figure 4:
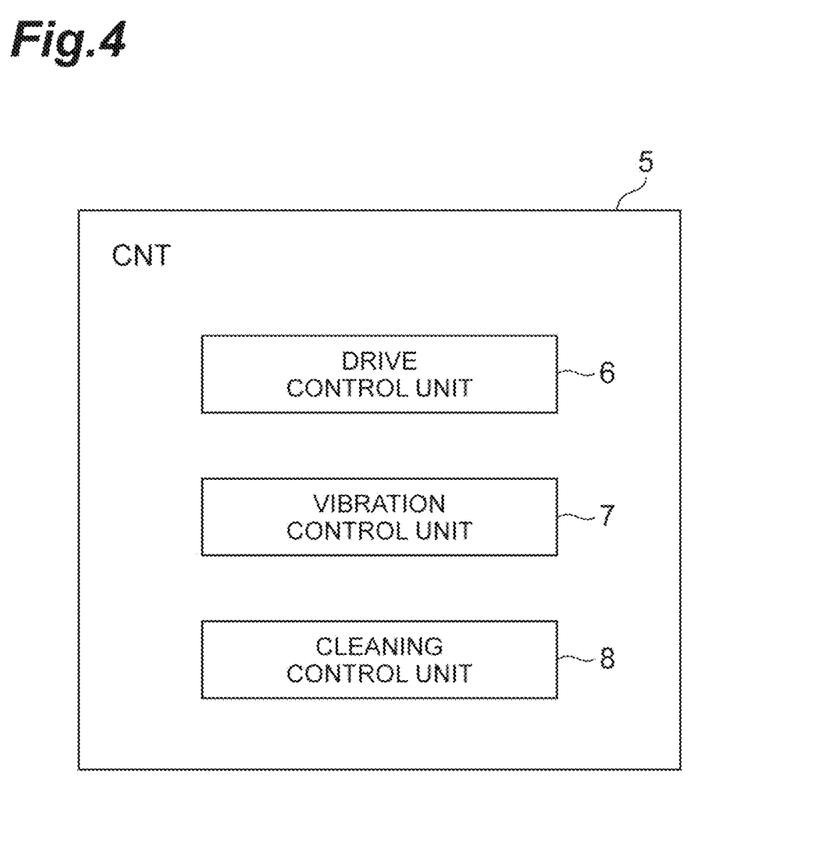
FIG. 4 is a block diagram illustrating an example of a controller of the additive manufacturing system according to the embodiment.

FIG. 4 is a block diagram illustrating an example of the controller of the additive manufacturing system according to the embodiment. As shown in FIG. 4, the controller 5 includes a drive control unit 6, a vibration control unit 7 and a cleaning control unit 8. The drive control unit 6 controls the rotating direction R, rotation speed, rotation start, rotation time and rotation stop of the container 10 by the drive unit 20. The vibration control unit 7 controls the vibration intensity, vibration frequency, vibration start, vibration time and vibration stop of the vibration unit 40 vibrating the storage unit 30. The cleaning control unit 8 controls the amount of the cleaning liquid supplied, supply speed, supply time and spray range or the like of the nozzle 81.

The controller 5 causes the drive unit 20, the vibration unit 40 and the nozzle 81 to operate based on three-dimensional CAD data of the molded object 100 stored in the storage apparatus, weight of the molded object 100, or raw material of the uncured slurry 110 or the like. The controller 5 may control the additive manufacturing apparatus 2.

Figure 5:
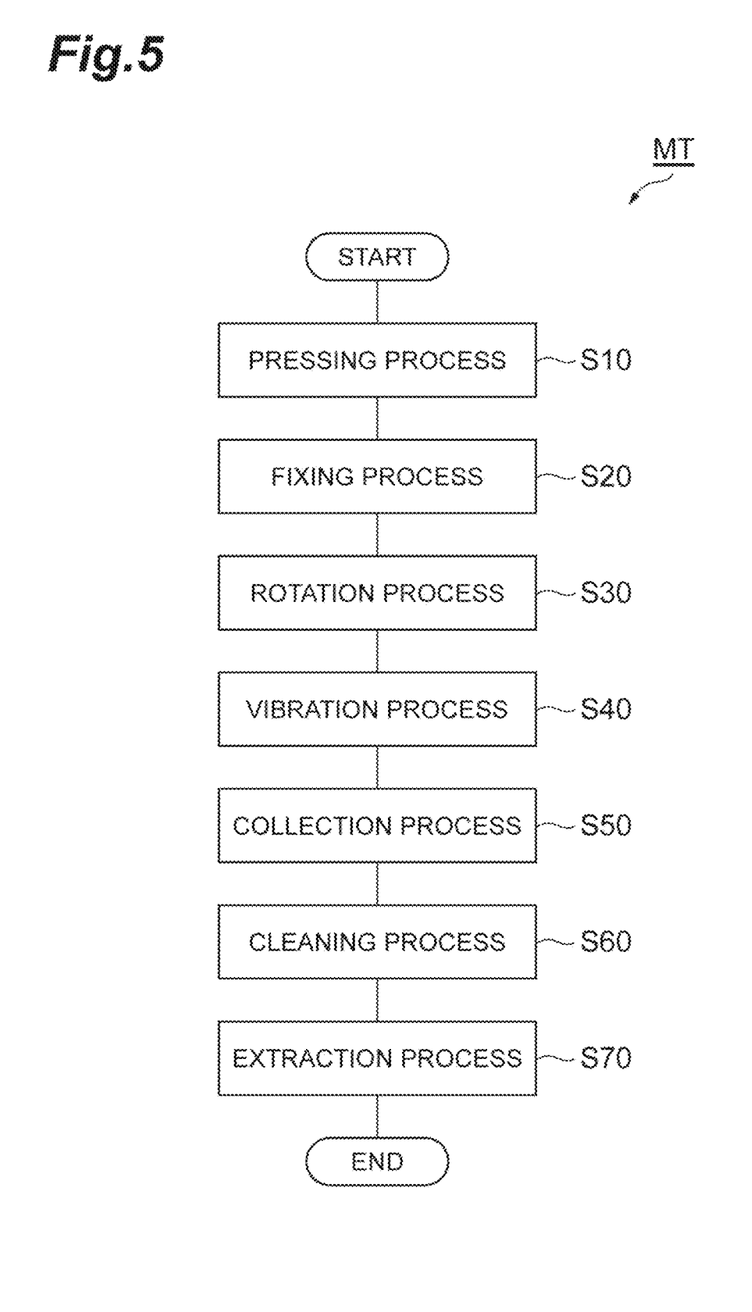
FIG. 5 is a flowchart illustrating an example of a removing method according to the embodiment.

Next, a slurry removing method by the additive manufacturing system 1 will be described. FIG. 5 is a flowchart illustrating an example of the removing method according to the embodiment. The removing method MT shown in FIG. 5 is executed by an operator or the controller 5.

Figure 6A:
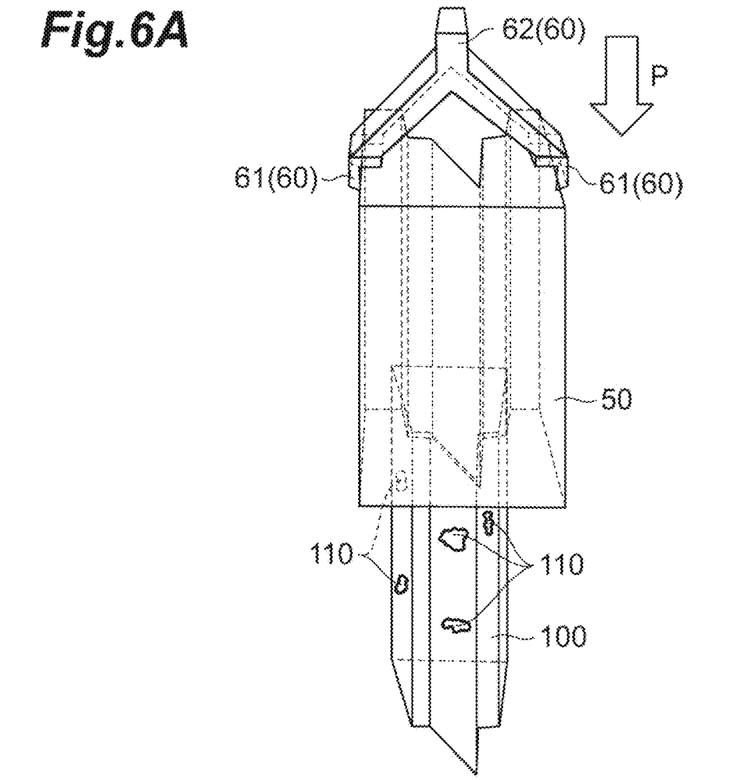
FIGS. 6A-6B is a schematic view illustrating a step of pressing of the removing method according to the embodiment.

First, in a pressing process (S10), the operator roughly removes the uncured slurry 110 attached to the molded object 100 using a concave mold. The concave mold is a jig having a recess along at least part of an outline of the molded object 100. The concave mold is formed, for example, based on the three-dimensional CAD data of the molded object 100 stored in the storage apparatus of the controller 5. FIGS. 6A-6B is a schematic view illustrating a step of pressing of the removing method according to the embodiment. FIG. 6A is a schematic view illustrating a preparation stage of a pressing process (S10). As shown in FIG. 6A, a concave mold 50 of the molded object 100 is fixed to a support member 60 and is provided above the molded object 100.

As an example, the operator directly operates the concave mold 50. The operator may operate the concave mold 50 via the support member 60 or cause a robot or the like to operate the support member 60. In the example in FIGS. 6A-6B, the concave mold 50 is supported by the support member 60. The support member 60 includes, for example, a holding section 61 and a body section 62. The holding section 61 is a claw member holding the concave mold 50 and is provided in the body section 62. The operator moves the support member 60 in a pressing direction P and thereby causes the concave mold 50 to engage with at least part of the molded object 100 while keeping the concave mold 50 in contact with the molded object 100. Since the concave mold 50 moves in contact with the surface of the molded object 100 of the support member 60, part of the uncured slurry 110 attached to the molded object 100 can be peeled off by friction.

Figure 6B:
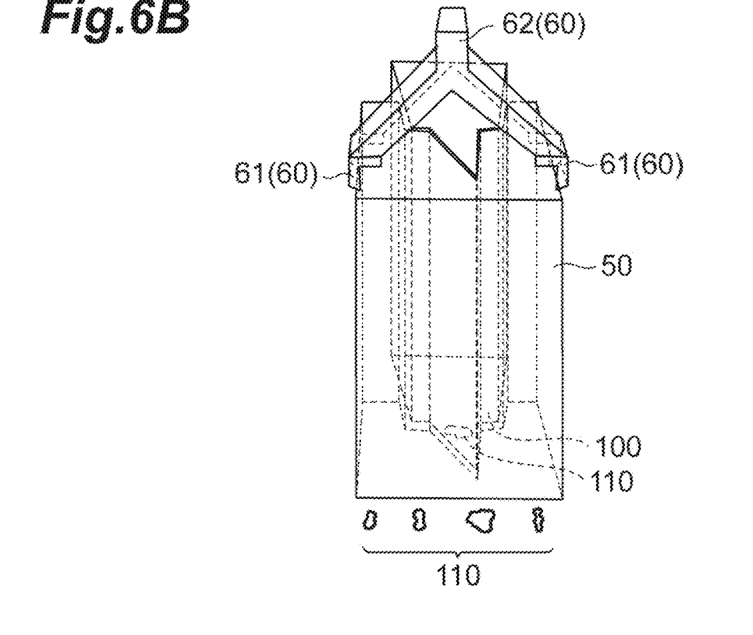

FIG. 6B is a schematic view illustrating a state after executing the pressing process (S10). As shown in FIG. 6B, the pressing process (S10) executed by the operator causes the uncured slurry 110 attached to the molded object 100 to be roughly removed. This makes it possible to reduce the amount of the uncured slurry 110 to be removed by the removing method MT in and after the pressing process (S10).

Returning to FIG. 5, the operator then fixes the molded object 100 to which the uncured slurry 110 is attached in the container 10 as a fixing process (S20). The molded object 100 to which the uncured slurry 110 is attached is fixed by the fixing members 14 of the container 10.

Next, the drive control unit 6 of the controller 5 causes the drive unit 20 to rotate the container 10 as a rotation process (S30). The drive control unit 6 causes the drive unit 20 to rotate the container 10 according to the predetermined rotating direction R, rotation speed and rotation time. A centrifugal force is thereby generated in the molded object 100 fixed in the container 10 toward the radial direction C, that is, toward the outside of the container 10. The uncured slurry 110 which is uncured slurry has a weaker binding force than that of the slurry cured as the molded object 100. Moreover, since slurry exhibits high thixotropy, viscosity of the slurry is reduced by the centrifugal force. For this reason, the uncured slurry 110 attached to the molded object 100 is separated from the molded object 100 by the centrifugal force generated in the container 10. Since the peripheral wall 12 of the container 10 has a plurality of small holes 13, the separated uncured slurry 110 is transferred from the inside to the outside of the container 10 via the plurality of small holes 13. Since the container 10 is housed in the storage unit 30, the separated uncured slurry 110 is stored inside the storage unit 30 via the plurality of small holes 13 provided in the peripheral wall 12 of the container 10. The storage unit 30 can collect the uncured slurry 110 without spraying it from the plurality of small holes 13 in the peripheral wall 12 of the container 10 to the outside of the container 10.

Next, the vibration control unit 7 of the controller 5 causes the vibration unit 40 to vibrate the storage unit 30 as a vibration process (S40). The vibration control unit 7 causes the vibration unit 40 to vibrate the storage unit 30 according to the predetermined vibration intensity, vibration frequency and vibration time. In this way, the fluidity of the uncured slurry 110 stored in the storage unit 30 increases, which makes it easier for the uncured slurry 110 to move to the exhaust port 32. The uncured slurry 110 is discharged from the exhaust port 32 to the outside of the storage unit 30.

Next, the operator collects the uncured slurry 110 discharged from the exhaust port 32 as a collection process (S50). For example, the operator connects the pipe connected to a collection container to the exhaust port 32 to thereby collect the uncured slurry 110 in the collection container via the pipe. The collected uncured slurry 110 is reused.

Next, the cleaning control unit 8 of the controller 5 causes the nozzle 81 to supply the cleaning liquid to the molded object and the uncured slurry 110 attached to the molded object in the container 10 as a cleaning process (S60). The cleaning process (S60) is executed, for example, by the drive unit 20 causing the container 10 to rotate based on the control by the drive control unit 6 of the controller 5. Even when the molded object 100 has a complicated shape, when the container 10 rotates, the supplied cleaning liquid can more easily penetrate into small parts of the molded object 100 by a centrifugal force. Since the uncured slurry 110 attached to the molded object 100 has higher fluidity than the molded object 100, it is mixed with the supplied cleaning liquid and is easily separated from the molded object 100. The uncured slurry 110 mixed with the cleaning liquid is transferred from the inside of the container 10 to the outside of the container 10 via the plurality of small holes 13 by a centrifugal force and stored in the storage unit 30. For example, the operator connects the pipe connected to the collection container to the exhaust port 32, and thereby collects and discards the uncured slurry 110 mixed with the cleaning liquid in the collection container via the pipe.

Next, the operator extracts the fixed molded object 100 from the inside of the container 10 as an extraction process (S70). When the molded object 100 is extracted from the inside of the container 10, the removing method MT ends and the molded object 100 is obtained, from which the uncured slurry 110 has been removed.

As described so far, according to the additive manufacturing system 1 and the removing method MT of the embodiment, it is possible to efficiently remove the slurry attached to the molded object 100. The additive manufacturing system 1 and the removing method MT cause the drive unit 20 to rotate the container 10 and generate a centrifugal force, and can thereby easily separate the uncured slurry 110 attached to the molded object 100. Furthermore, with the provision of the storage unit 30, the uncured slurry 110 transferred from the plurality of small holes 13 in the peripheral wall 12 of the container 10 to the outside of the container 10 can be collected without being sprayed to the outside. Furthermore, the vibration unit 40 vibrates the storage unit 30, and the additive manufacturing system 1 and the removing method MT can thereby easily discharge the uncured slurry 110 in the storage unit 30 separated from the molded object 100 from the exhaust port 32.

The nozzle 81 supplies a liquid or gas to the molded object 100 and the uncured slurry 110 attached to the molded object 100, and when the container 10 rotates, the centrifugal force makes it easier for the supplied liquid or gas to penetrate into small parts of the molded object 100. For this reason, man-hours in the cleaning step of the molded object 100 are reduced. Since the slurry 110 attached to the molded object 100 has higher fluidity than the molded object 100, it is mixed with the supplied liquid or gas and easily separated from the molded object.

In the pressing process (S10) of the removing method MT, at least part of the uncured slurry 110 attached to the molded object 100 is roughly removed by the pressing of the concave mold 50. This reduces the amount of the uncured slurry 110 removed in the removing method MT in and after the pressing process (S10), and so the removing method MT allows the uncured slurry 110 to be efficiently removed from the molded object 100.

Figure 7:
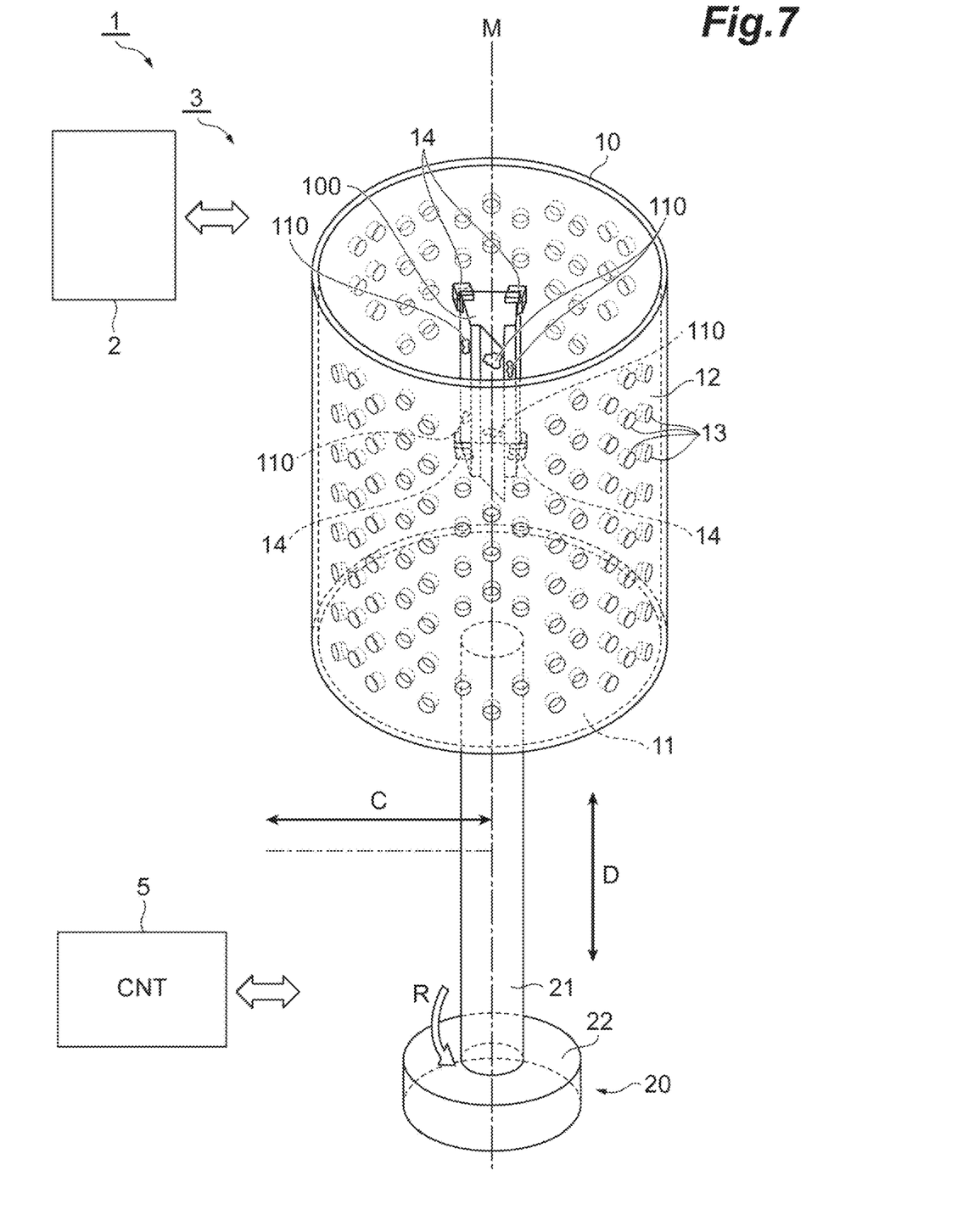
FIG. 7 is a schematic view illustrating an example of the additive manufacturing system according to the embodiment.

Various exemplary embodiments have been described so far, but various omissions, substitutions or changes can be made without being limited to the aforementioned exemplary embodiments. For example, two or more molded objects 100 may be provided in the container 10. In this case, the uncured slurry 110 can be efficiently removed by simultaneously executing the removing method MT on the plurality of molded objects 100. The removing apparatus 3 may be provided with none of the storage unit 30, the vibration unit 40 or the nozzle 81. FIG. 7 is a schematic view illustrating an example of the additive manufacturing system according to the embodiment. As shown in FIG. 7, outside the container 10, the removing apparatus 3 may be provided with none of the storage unit 30, the vibration unit 40 or the nozzle 81.

The container 10 need not be provided with the base section 11. In this case, the additive manufacturing system 1 and the removing method MT can prevent the uncured slurry 110 separated from the molded object 100 from being deposited onto the top surface 11*a* of the base section 11 of the container 10. The container 10 may be provided with a top surface at the top end. In this case, the additive manufacturing system 1 and the removing method MT can prevent the uncured slurry 110 from being discharged from the opening of the container 10 at the top end to the outside of the storage unit 30. The container 10 may be driven by the drive unit 20 to rotate in a direction opposite to the rotating direction R.

The drive unit 20 may be disposed above the container 10. In this case, the storage unit 30 may be provided with neither the opening 34 nor the rod housing cylinder 36. The drive unit 20 may include, for example, a beam member extending in the radial direction C at the bottom end of the rod 21 and connect the beam member and the top end of the peripheral wall 12 of the container 10. The storage unit 30 may be provided with a top surface at the top end. The nozzle 81 may relatively rotate with respect to the container 10 in the rotating direction R or in a direction opposite to the rotating direction R. The nozzle 81 may suck and cause the uncured slurry 110 in the container 10 to be separated from the molded object 100.

The operation by the operator in the removing method MT may be performed by the controller 5 and a robot. In this case, the removing apparatus 3 may be provided with the concave mold 50 and the support member 60. According to the removing method MT, the operator or robot may press the concave mold 50 for engagement along two or more directions of up-down, left-right and front-back directions of the molded object 100 as the pressing direction P in the pressing process (S10). In this case, the concave mold 50 has a recess along at least part of the outline of the molded object 100 in each pressing direction.

The order of the respective processes in the removing method MT may be changed as appropriate. More specifically, the pressing process (S10) may be executed after the fixing process (S20). In this case, the pressing process (S10) may be executed in the container 10. The extraction process (S60) may be executed before the vibration process (S40). The vibration process (S40), the collection process (S50) or the cleaning process (S60) may be executed simultaneously with start of the rotation process (S30). The pressing process (S10), the vibration process (S40), the collection process (S50) or the cleaning process (S60) need not be executed.

Description of the Numerals

1 . . . additive manufacturing system, 2 . . . additive manufacturing apparatus, 3 . . . removing apparatus, 5 . . . controller, 6 . . . drive control unit, 7 . . . vibration control unit, 10 . . . container, 11 . . . base section, 11*a* . . . top surface, 11*b* . . . undersurface, 12 . . . peripheral wall, 13 . . . small hole, 14 . . . fixing member, 20 . . . drive unit, 21 . . . rod, 22 . . . drive source, 30 . . . storage unit, 32 . . . exhaust port, 34 . . . opening, 36 . . . rod housing cylinder, 40 . . . vibration unit, 45 . . . communication port, 50 . . . concave mold, 60 . . . support member, 61 . . . holding section, 62 . . . body section, 81 . . . nozzle, 82 . . . cleaning pipe, 83 . . . cleaning pump, 100 . . . molded object, 110 . . . slurry.

What is claimed is:

1. An additive manufacturing system comprising:
   an additive manufacturing apparatus configured to form a molded object by curing slurry that is a base material of the molded object; and
   a removing apparatus configured to remove the slurry attached to the molded object, wherein
   the removing apparatus comprises:
   a container having an axis of rotation and a peripheral wall provided with a plurality of small holes, the container permitting the molded object to be fixed therein;
   a fixing member provided inside the peripheral wall of the container to restrict the movement of the molded object; and
   a drive unit configured to cause the container to rotate around the axis of rotation,
   wherein the removing apparatus comprises a nozzle configured to supply a liquid or gas toward an inner surface of the container, and the nozzle is disposed within the container and supplies a liquid or gas from the center of the container toward the inner surface of the container.

2. The system according to claim 1, wherein the removing apparatus comprises:
   a storage unit having an exhaust port providing communication between an outside and an inside, housing the container therein and configured to store therein the slurry to be transferred to the outside of the container via the small holes; and
   a vibration unit configured to vibrate the storage unit and discharge the slurry in the storage unit from the exhaust port.

3. The system according to claim 2, wherein the removing apparatus comprises a nozzle configured to supply a liquid or gas toward an inner surface of the container.

4. The system according to claim 1, wherein the fixing member is a member freely attachable to the peripheral wall and detachable from the peripheral wall.

* * * * *